Nov. 5, 1940.         T. B. CHACE                2,220,210
                METHOD OF LINING BEARING SURFACES
                     Filed March 21, 1938
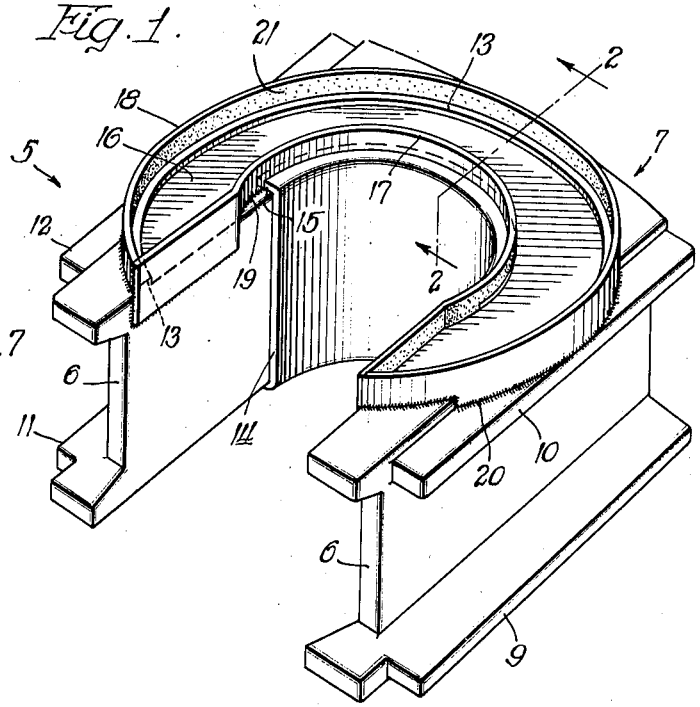
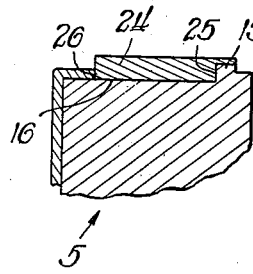
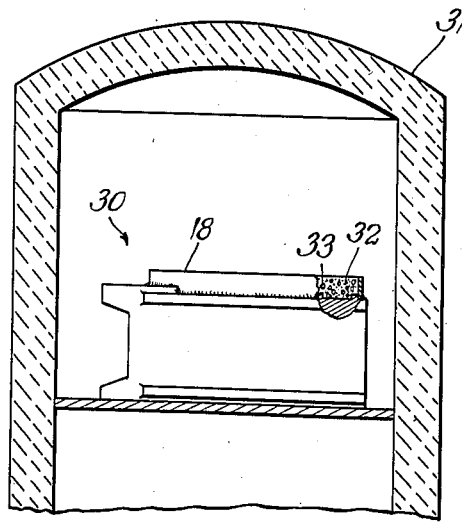
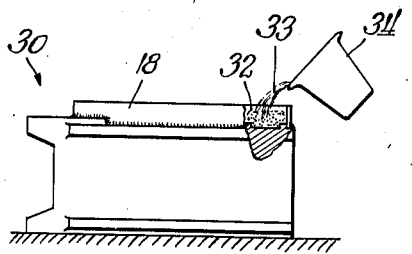
Inventor:
Thomas B. Chace.

Patented Nov. 5, 1940

2,220,210

UNITED STATES PATENT OFFICE 2,220,210

METHOD OF LINING BEARING SURFACES

Thomas B. Chace, Winnetka, Ill., assignor to Clad Metals Industries, Inc., Chicago, Ill., a corporation of Illinois Application March 21, 1938, Serial No. 197,093

3 Claims. (Cl. 29—149.5)

My invention relates, generally, to a method of lining bearing surfaces and it has particular relation to a method of lining and relining locomotive driving boxes or liner boxes on the outer face of the driving box which contacts the flat surface of the locomotive wheel.

It has always been a major problem of the railroads to secure such a lining which would withstand a high impact load such as is experienced in rounding curves, and the severe wear due to high speed. It is quite often necessary to build up or repair these linings or bearings between regular servicings of locomotives. This repair is very costly in that the locomotive is temporarily out of use for a minor repair.

In the past it has been the practice to line and reline these boxes by casting bearing metal on the hub face of the driving boxes and to depend upon dovetails, machined keyways, insert pins, and other mechanical expedients to help hold the lining to the driving boxes. These methods have never resulted in a real bond between the bearing metal and the cast steel box. As a consequence this method has resulted in frequent cracking and tearing loose of the bearing metal over a comparatively short period of operation.

More recent practice has been to build up the bearing metal to a height of about 1½" by depositing bronze welding rod by carbon or metallic arc. This has proved much more satisfactory than the former method, in that a real bond is secured and higher strength, non-ferrous metals may be used. However, this method is extremely costly in that only ½" or ⅝" diameter rod can be used and it is necessarily a very slow operation to lay down between twenty and thirty pounds of metal by such types of welding. Furthermore, the extremely high temperatures of the metallic or carbon arc at the cast steel surface cause a very high iron pick-up, to as much as 10%, into the bearing metal. Also, there is the danger of strain cracking the cast steel housing, due to localized high temperatures from the arc. Further, it is difficult to get entirely sound deposits from the depositing of so much metal, which makes subsequent relining by this method very difficult in that the porous deposits become filled with oil and prevent good welding.

In view of the foregoing, an object of my invention is to provide a new method of lining and relining locomotive driving boxes which is quicker, cheaper, and more convenient than methods heretofore practiced.

Another object of my invention is to produce a liner for locomotive driving boxes which will wear longer and is more resistant to end play and friction wear than liners produced heretofore.

Another object of my invention is to provide a new method of lining and relining locomotive driving boxes which is adapted to the use of a wide variety of lining metals.

Another object of my invention is to provide a new method of lining locomotive driving boxes wherein worn driving boxes may be relined and restored to a condition fully equal to newly lined driving boxes, at a minimum of cost and time.

Another object of my invention is to provide a new method of lining and relining locomotive driving boxes wherein the cast steel housing is not subjected to localized high temperatures with their consequent harmful effects, such as result when using the welding method of lining.

Another object of my invention is to provide a new method of lining and relining locomotive driving boxes which obviates depending on machined keyways, dovetails, insert pins and other mechanical means for fastening liners, such as used heretofore.

Other objects of my invention will, in part, be obvious and in part appear hereinafter.

I have devised a method of lining and relining bearing surfaces, and especially the bearing surfaces of locomotive driving boxes, which overcomes the above mentioned difficulties and, in the preferred form, comprises: forming a liquid-tight mould space around the bearing metal recess of the driving box, cleaning the surface of the recess, covering the surface with a slag or flux to prevent oxidation, preheating the whole driving box so as to secure uniform temperature throughout, and casting bearing metal to fill the mould space.

Accordingly, my invention is disclosed in the embodiment hereof shown in the accompanying drawing, and it comprises the features of construction, combination elements and arrangement of parts which will be exemplified in the description hereinafter set forth and the scope of the application of which will be indicated in the appended claims.

For a more complete understanding of the nature and scope of my invention reference may be had to the following detailed description, taken in connection with the accompanying drawing, in which:

Figure 1 is a perspective view of a locomotive driving box showing the mould space in which the bearing metal is cast, and formed by mould strips and the recessed surface of the driving box casting;

Figure 2 is a detail sectional view taken along the line 2—2 of Figure 1, after the bearing metal has been cast and the mould strips removed;

Figure 3 is a view, in side elevation, showing a locomotive driving box casting placed in a furnace, a part of the casting being broken away in order to show the details of construction; and Figure 4 is a view, in side elevation, showing a method of filling the mould space with bearing metal, a part of the casting being broken away in order to show the details of construction.

Referring to Figure 1 of the drawing, the reference character 5 designates, generally, a locomotive driving box casting which may be made of cast steel. There are numerous designs of locomotive driving boxes, and the casting 5 is one design that may be used. It comprises the vertical walls 6 which are cast integrally with and space apart the parallel top and bottom surfaces shown, generally, at 7 and 8, respectively. The parallel flanges 9, 10, 11 and 12 hold the driving box in place when assembled on the locomotive. The top surface shown, generally, at 7, is adjacent to the flat surface of the locomotive wheel when assembled, and for this reason is lined with a bearing metal. A ridge 13 in the form of a horse shoe projects above the top surface 7 to retain the bearing metal. A liner 14 of bearing metal is inserted in the casting 5, as shown, to furnish a bearing surface against which the driving axle turns. It is held in the casting by the end portions 15, bent over to fit the top and bottom surfaces 7 and 8 of the casting. Usually, grease glands are cut in the bearing surface of the liner 14, through which grease can be supplied to lubricate it.

To prepare the casting 5 for lining after it has been cast, the ridge 13 and the portion of the top surface 7 lying within the ridge 13 are machined to remove scale and form a welding surface. The reference character 16 designates the portion of the top surface which is machined. After machining the liner 14 is fitted into the casting as shown, and mould strips 17 and 18 are welded on to the prepared casting to form a liquid-tight mould space. The mould strips 17 and 18 may be replaced by a single mould strip or several mould strips, depending upon what may be the most convenient. These mould strips 17 and 18 may be arc welded, as shown at 19 and 20. After the mould space has been thus formed its welding surfaces are cleaned, as by sand blasting. If desired, the inside of the mould strips 17 and 18 can be coated with a non-welding material such as lamp black, shown at 21, to prevent the bearing metal from welding thereto. This completes the formation of a liquid-tight mould space on the surface 7 of the casting 5, which may be filled by such methods as are set forth hereinafter.

After the mould construction described in connection with Figure 1 is filled with bearing metal and the mould strips 17 and 18 (Fig. 1) are removed, a sectional view of the liner thus formed appears as in Figure 2. The liner 24 of bearing metal as shown has not been machined to the desired thickness. As shown in Figure 2, the liner 24 is integrally bonded to the welding portion 16 of the top surface 7 of the casting 5, to the ridge at 25, and to the turned-over end portion 15 of the liner 14 at 26.

In Figure 3 the reference character 30 designates, generally, a locomotive driving box casting which has been prepared for lining as described above in connection with Figure 1. Before the prepared casting 30 is placed in the furnace 31 the welding surfaces 16, 25, 26, Figure 2, are cleaned as by sand blasting. If a non-welding material 21 (Figure 1) is to be put on the mould strips 17 and 18, it should preferably be done after the sand blasting operation is performed. The mould space is filled with a flux 32 and pieces of bearing metal 33. The flux 32 may be one such as boric acid. The prepared casting 30 is heated in the furnace 31 sufficiently to melt the pieces of bearing metal 33 and to allow the bearing metal to bond to the welding surfaces 16, 25, 26, Figure 2. The flux 32 will fuse prior to the bearing metal 33 and protect the welding surfaces 16, 25, 26, Figure 2, from oxidation. When the bearing metal 33 melts it will displace the flux 32, which will rise to the top of the molten metal and protect its surface from oxidation. Usually a temperature between 1500° F. and 2200° F., depending upon the analysis of the bearing metal 33, is sufficient. An amount of bearing metal 33 is used that will form a liner of somewhat greater thickness than finally desired, which permits machining it to the desired thickness, as set forth hereinbefore.

In Figure 4 the prepared casting 30 is cleaned by sand blasting just as described in connection with Figure 3. However, the mould space is filled solely with flux 32 and heated in a furnace, as 31, Figure 3. Usually a temperature of 1500° F. to 2200° F. is sufficient, depending on the analysis of the bearing metal used. The preheated prepared casting 30, with molten flux 32 protecting its welding surfaces 16, 25, 26 (Figure 2) is removed from the furnace and molten bearing metal 33 is poured from a ladle 34 into the mould space. The molten bearing metal 33 displaces the flux 32 and bonds to the welding surfaces 16, 25, 26, Figure 2.

In either of the methods described in connection with Figures 3 and 4, the molten bearing metal 33 is allowed to solidify after welding to the surfaces 16, 25, 26, Figure 2, and the mould strips 17 and 18, Figure 1, are removed. After removing the mould strips the solidified bearing metal 33 may be machined to form a liner of desired thickness, as previously set forth. If desired, however, the mould strips 17 and 18, Figure 1, may be left in place and be machined together with the bearing metal 33. This is especially preferred if the mould strips are of the same material as the bearing metal.

Any bearing metal can be used, but the most desirable are those having high resistance to impact, together with good bearing properties. Tin-bronze, containing 8 to 10 percent tin is satisfactory; also silicon-bronze, containing up to 3½% silicon with up to 10% lead, and with small quantities of such elements as manganese or zinc to make the alloy more machinable, or to improve its casting properties. Leaded phosphor-bronzes containing up to 10% lead and from about .02% up to .35% phosphorus are satisfactory.

The methods illustrated in connection with Figures 3 and 4 permit the use of bearing metals in their cheapest form, such as ingots, cast pieces, or small scrap pieces, as against the relatively high cost of bearing metals in the form of welding rods as applied by the metallic arc method. Also, these methods assure a much more sound and homogeneous liner than obtained by methods used heretofore.

For relining the driving boxes it is merely necessary to construct a mould space, sand blast or otherwise clean the upper surface of the remaining bearing metal, cover with a slag or flux to prevent oxidation, and melt down or cast sufficient new bearing material to restore it to its original thickness.

The mould strip used may be in one or several pieces and may be of steel or other material having a higher melting temperature than the lining metal. Since the mass of lining metal cast is comparatively small, strips of the same analysis as the lining metal may be used, which would eliminate the necessity of removing the mould strip. The mould or dam could also be built up by depositing lining or bearing metal, by the metallic or carbon arc method, to a sufficient height to form the mould space.

The utility of my improved method applied to locomotive driving boxes is very great. It is estimated that the amount of copper alloy used in a normal year for lining and relining these driving boxes is about 7,000,000 pounds.

Since certain further changes may be made in the foregoing methods of lining bearing surfaces, and different embodiments of the invention may be made without departing from the scope thereof, it is intended that all matter shown in the accompanying drawing or described hereinbefore shall be interpreted as illustrative only, and not in a limiting sense.

I claim as my invention:

1. In the method of lining locomotive driving boxes, the steps which comprise: welding relatively thin mould strips onto a lateral surface of a locomotive driving box casting, so as to form with said lateral surface an open-faced liquid-tight mould space, cleaning the welding surfaces of said formed open-faced liquid-tight mould space, coating the inner surface of said mould strips with a non-welding material, filling said open-faced liquid-tight mould space with a flux and solid pieces of bearing metal, heating said driving box casting with the attached mould construction thus formed and filled, allowing the bearing metal to solidify, removing the mould strips, and machining the bearing metal to the desired thickness.

2. In the method of lining locomotive driving boxes, the steps which comprise: welding relatively thin mould strips onto a lateral surface of a locomotive driving box casting, so as to form with said lateral surface an open-faced liquid-tight mould space, cleaning the welding surfaces of said formed open-faced liquid-tight mould space, filling said open-faced liquid-tight mould space with a flux and solid pieces of bearing metal, heating said driving box casting with attached mould construction thus formed and filled, allowing the bearing metal to solidify, and machining the mould strips and bearing metal to the desired thickness.

3. In the method of lining locomotive driving boxes, the steps which comprise: welding thin metal strips about the lateral bearing surface of a locomotive driving box casting so as to form with said lateral bearing surface an open-faced liquid-tight mould space, cleaning the welding surface of said open-faced liquid-tight mould space, coating said cleaned welding surface with flux, preheating said driving box casting, casting molten bearing metal into said liquid-tight mould space, allowing the bearing metal to solidify, and finishing off the surface of the solidified bearing metal.

THOMAS B. CHACE.